United States Patent
Redding et al.

(10) Patent No.: US 6,820,716 B2
(45) Date of Patent: Nov. 23, 2004

(54) ACOUSTIC ISOLATOR FOR WELL LOGGING SYSTEM

(75) Inventors: Charles E. Redding, Houston, TX (US); Herbert W. Beimgraben, Spring, TX (US); Charles Hartmann, Houston, TX (US); Douglas Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/345,730

(22) Filed: Jan. 16, 2003

(65) Prior Publication Data

US 2004/0141415 A1 Jul. 22, 2004

(51) Int. Cl.$^7$ ................................................ G01V 1/30
(52) U.S. Cl. ...................... 181/106; 181/102; 181/911; 367/25; 175/50
(58) Field of Search .................... 367/25, 911; 181/102, 181/104, 106, 207–9; 175/40, 50; 166/250.16

(56) References Cited

U.S. PATENT DOCUMENTS

| | | | | |
|---|---|---|---|---|
| 3,773,285 A | * | 11/1973 | Morrill | 248/15 |
| 4,529,055 A | * | 7/1985 | Gotoh et al. | 180/210 |
| 4,564,160 A | * | 1/1986 | Vermilye | 244/110 B |
| 4,821,980 A | * | 4/1989 | Clausen et al. | 244/54 |
| 4,872,526 A | * | 10/1989 | Wignall et al. | 181/102 |
| 5,170,018 A | * | 12/1992 | Potier | 181/101 |
| 5,343,001 A | * | 8/1994 | Cowles et al. | 181/102 |
| 5,731,550 A | * | 3/1998 | Lester et al. | 181/102 |
| 6,535,458 B2 | * | 3/2003 | Meehan | 367/81 |
| 6,588,267 B1 | * | 7/2003 | Bradley | 73/152.47 |
| 6,643,221 B1 | * | 11/2003 | Hsu et al. | 367/162 |

* cited by examiner

*Primary Examiner*—Nelson Moskowitz
(74) *Attorney, Agent, or Firm*—Madan, Mossman & Sriram, P.C.

(57) ABSTRACT

An acoustic isolator for attenuating through-tool acoustic signals comprises a plurality of u-shaped link members, where each link member has two sets of ears. A plurality of yoke members are adapted to fit between cooperating sets of ears. A plurality of pins connect the plurality of u-shaped link members to the plurality of yoke members for providing limited flexural compliance. The isolator may be made from metallic and/or composite materials.

18 Claims, 5 Drawing Sheets

ACOUSTIC ISOLATOR FOR WELL LOGGING SYSTEM

BACKGROUND OF THE INVENTION

1. Field of the Invention

The present invention pertains to acoustic well logging and more particularly to an acoustic isolator for use in an acoustic logging system.

2. Related Prior Art

Acoustic logging tools for measuring properties of the sidewall material of both cased and uncased boreholes are well known. Essentially such tools measure the travel time of an acoustic pulse propagating through the sidewall material over a known distance. In some studies, the amplitude and frequency of the acoustic pulse, after passage through the earth, are of interest.

In its simplest form, an acoustic logger consists of one or more transmitter transducers that periodically emit an acoustic signal into the formation around the borehole. One or more receiver transducers, spaced apart by a known distance from the transmitter, receives the signal after passage through the surrounding formation. The difference in time between signal transmission and signal reception divided into the distance between the transducers is the formation velocity. If the transducers do not contact the borehole sidewall, allowance must be made for time delays through the borehole fluid.

Throughout this disclosure, the term "velocity", unless otherwise qualified, shall be taken to mean the velocity of propagation of an acoustic wavefield through an elastic medium.

Acoustic wavefields propagate through elastic media in different modes. The modes include: compressional or P-waves, wherein particle motion is in the direction of wave travel; transverse shear or S-waves, which, assuming a homogeneous, isotropic medium, may be polarized in two orthogonal directions, with motion perpendicular to the direction of wave travel; Stonley waves, which are guided waves that propagate along the fluid-solid boundary of the borehole; and compressional waves that propagate through the borehole fluid itself. There also exist asymmetrical flexural waves as will be discussed later.

P-waves propagate through both fluids and solids. Shear waves cannot exist in a fluid. Compressional waves propagating through the borehole fluid may be mode-converted to shear waves in the borehole sidewall material by refraction provided the shear-wave velocity of the medium is greater than the compressional-wave velocity of the borehole fluids. If that is not true, then shear waves in the sidewall material can be generated only by direct excitation.

Among other parameters, the various modes of propagation are distinguishable by their relative velocities. The velocity of compressional and shear waves is a function of the elastic constants and the density of the medium through which the waves travel. The Swave velocity is, for practical purposes, about half that of P-waves. Stonley waves may be somewhat slower than S-waves. Compressional wavefields propagating through the borehole fluid are usually slower than formational shear waves but for boreholes drilled into certain types of soft formations, the borehole fluid velocity may be greater than the sidewall formation S-wave velocity. The velocity of flexural waves is said to approach the S-wave velocity as an inverse function of the acoustic excitation frequency. Some authors refer to flexural waves as pseudo-Raleigh waves.

In borehole logging, a study of the different acoustic propagation modes provides diagnostic information about the elastic constants of the formation, rock texture, fluid content, permeability, rock fracturing, the goodness of a cement bond to the well casing and other data Typically, the output display from an acoustic logging tool takes the form of time-scale recordings of the wave train as seen at many different depth levels in the borehole, each wave train including many overlapping events that represent all of the wavefield propagation modes. For quantitative analysis, it is necessary to isolate the respective wavefield modes. S-waves are of particular interest. But because the S-wave arrival time is later than the P-wave arrival time, the S-wave event often is contaminated by later cycles of the P-wave and by interference from other late-arriving events. Therefore, known logging tools are designed to suppress undesired wave fields either by judicious design of the hardware or by post-processing using suitable software. Both monopole and dipole signals may be transmitted and received using appropriately configured transducers. Because the systems measures signal transit time, it is crucial that the spatial relationship between the transmitter and receivers remain essentially constant during logging. For monopole signals, the distance between transmitter and receivers should remain essentially constant. For dipole signals, both the distance and rotational orientation between transmitters and receivers should remain essentially constant during logging.

As is well known, the acoustic transmitter and the acoustic receivers are mounted at opposite ends of a logging sonde. The body of the sonde is usually of a suitable metal such as stainless steel or the like which is acoustically conductive. Therefore, in order to prevent unwanted acoustic energy traveling up the sonde from interfering with desired acoustic energy propagating through the formation, is it required that an acoustic isolator be inserted in the sonde between the transmitter and the receivers.

In addition, the deployment of acoustic tools using coiled tubing or drill pipe has increased the loading, both axial and rotational, on the acoustic sonde. For example, in highly deviated or horizontal wellbores, the logging tool may be deployed with drill pipe. The drill pipe may be slowly rotated to reduce the frictional resistance between the pipe and the borehole wall while deploying or extracting the logging tool. Residual axial and/or rotational loading may be transferred through the acoustic logging tool, even during the logging sequence.

Prior art isolators, commonly used with wireline deployment, have proven to be fragile or to deform excessively, either axially or rotationally, under the high loading encountered in pipe conveyed logging. For example, U.S. Pat. No. 3,191,141, issued Jun. 22, 1965 to Schuster, describes a slotted sleeve isolator placed between a transmitter and a receiver. The slotted arrangement forms a serpentine travel path for acoustic wave energy, both delaying and attenuating the wave. The slotted sleeve is often adequate for tools with only monopole transmitters, but has often proved inadequate for dipole or other forms of multipole transmissions. In addition, the slotted configuration has proven to be fragile in high axial loading situations.

U.S. Pat. No. 4,872,526, issued Oct. 10, 1989 to A. Wignall et al., U.S. Pat. No. 5,728,978 to Roberts et al., and U.S. Pat. No. 5,229,553 to Lester et al., all use a plurality of captured elastomeric, typically rubber, elements to provide through-tool signal attenuation. The elastomeric elements unacceptably deform both axially and rotationally under the high loading of pipe conveyed logging. This deformation results in unacceptable errors in the resulting logs, especially from multi-pole sources.

There is a need for an acoustic isolator that will be sufficiently flexible to pass through deviated boreholes yet sufficiently rigid to provide axial and rotational dimensional stability between the transmitters and receivers of the logging tool.

SUMMARY OF THE INVENTION

The present invention provides a system and method for attenuating through-tool acoustic signals in an acoustic logging tool.

In one aspect of the present invention, an acoustic isolator for attenuating through-tool acoustic signals, comprises a plurality of u-shaped link members, where each link member has two sets of ears. A plurality of yoke members are adapted to fit between cooperating sets of ears. A plurality of pins connect the plurality of u-shaped link members to the plurality of yoke members for providing limited flexural compliance.

In another aspect, a system for determining the acoustic properties of a formation surrounding a wellbore, comprises a tubular member extending in the wellbore from a surface location to a downhole formation of interest. An acoustic logging tool is attached proximate a bottom end of the tubular member, wherein the acoustic logging tool has a transmitter section; a receiver section; and a pin-connected acoustic isolator for attenuating through-tool acoustic signals.

In one embodiment, a method for performing acoustic investigations of a formation surrounding a wellbore, comprises conveying an acoustic logging tool into the wellbore. At least one acoustic source is activated for generating acoustic signals in the formation and the logging tool. The through-tool acoustic signals are attenuated using an acoustic isolator comprising a plurality of u-shaped link members cooperatively pinned together through a plurality of yoke members. Signals through the formation and the attenuated through-tool signals are received with at least one receiver in a receiver section on a side of the acoustic isolator opposite from the acoustic source.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

The present invention provides a system and method for attenuating acoustic waves in a down hole tool that is being used to obtain information about subsurface formations, some of which are believed to be holding hydrocarbon deposits.

As used herein, the tool axis refers to a longitudinal axis of the tool that is substantially parallel to the centerline of the wellbore. Angular deviations refer to angles relative to the tool axis. Rotation refers to rotation about the tool axis.

Figure 1:
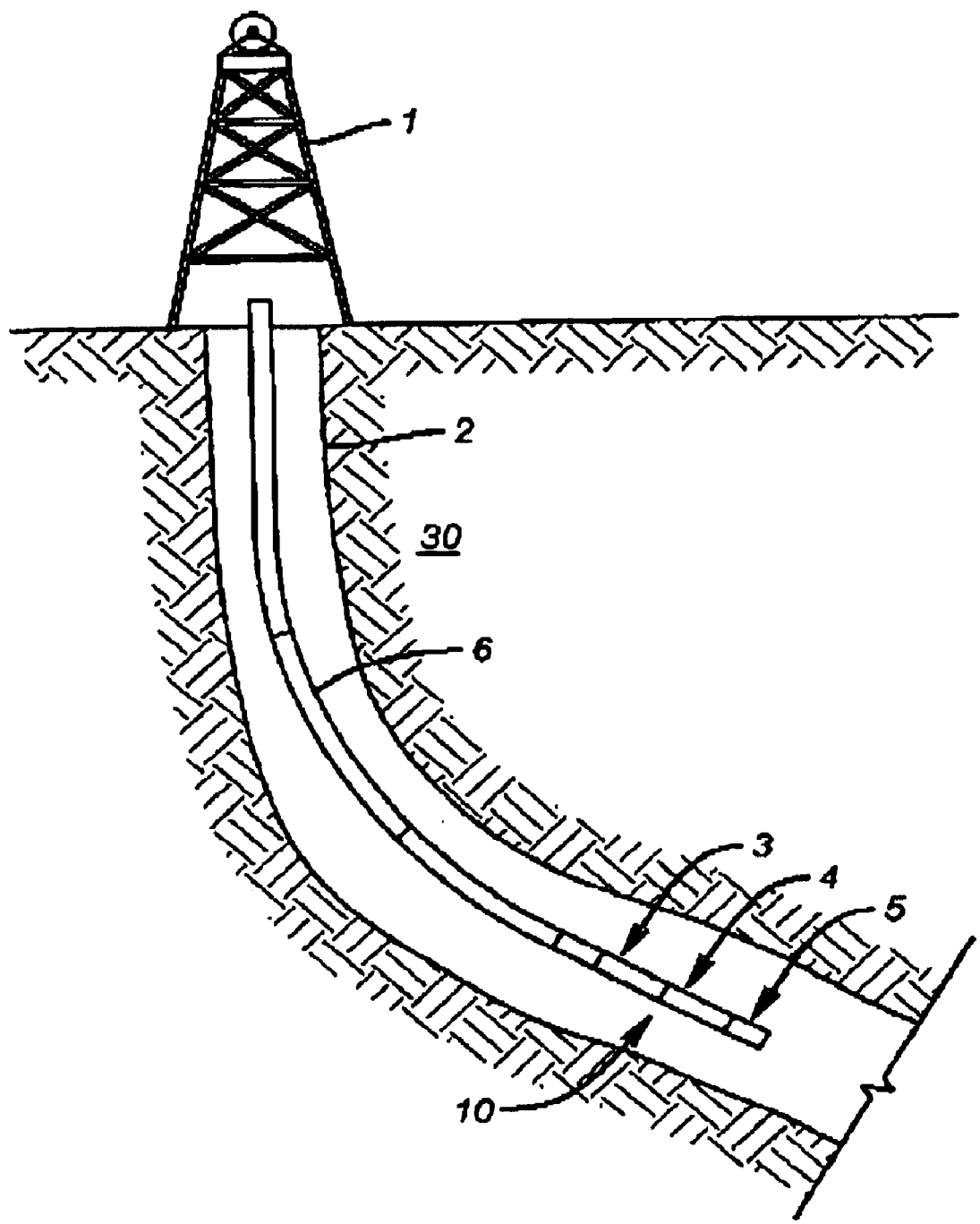
FIG. 1 is a schematic drawing of a logging system in a wellbore according to one preferred embodiment of the present invention.

FIG. 1 shows a conventional drilling rig 1, from which a jointed pipe 6 is conveyed into a wellbore 2. The wellbore 2 may be deviated, including substantially horizontal sections (not shown). An acoustic logging tool 10 is attached near the bottom of the jointed pipe 6. As is common in the art, other logging tools (not shown) may be attached to the acoustic logging tool 10 above and/or below the acoustic logging tool 10. The jointed pipe 6 is sufficiently stiff to convey the logging tools into such deviated wellbores without buckling. As such, the logging tool 10 may experience substantial axial loads. In addition, the jointed pipe 6 may be rotated during deployment to reduce the friction against a sidewall of the wellbore 2 or to orient the logging tool in a preferred manner with respect to the formation 30.

Figure 2:
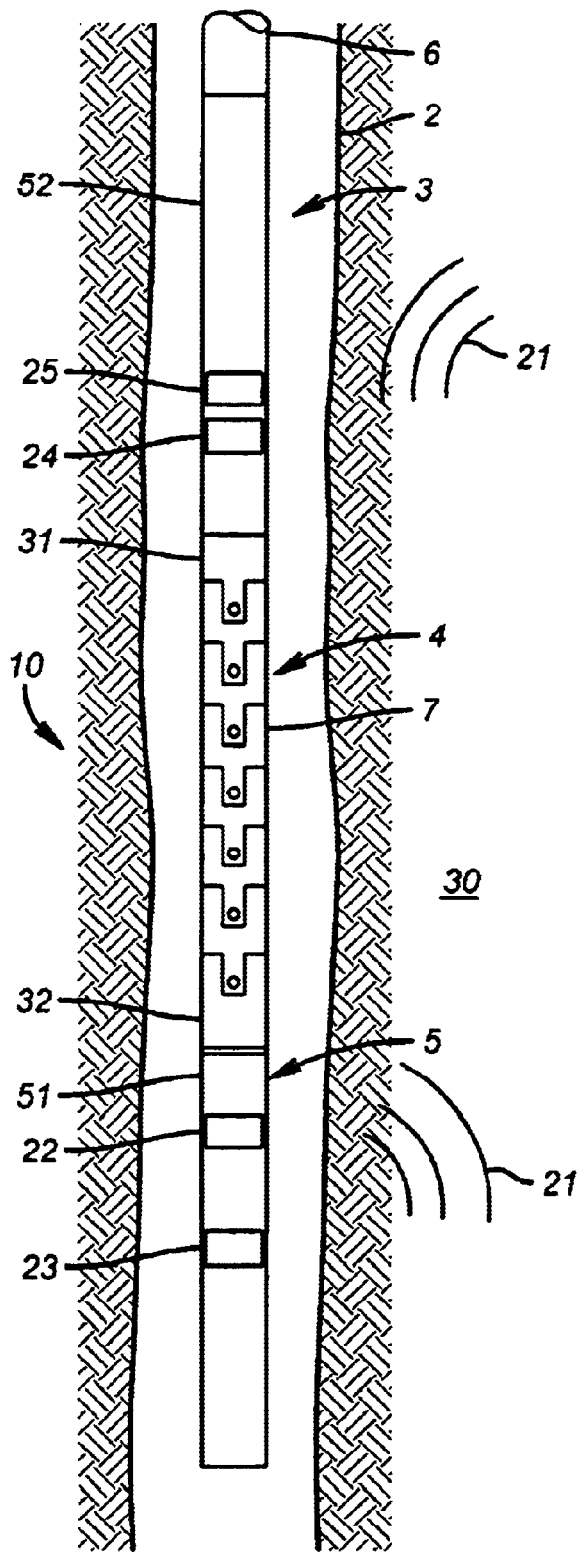
FIG. 2 is a schematic drawing of an acoustic logging tool in a wellbore according to one preferred embodiment of the present invention.

The acoustic logging tool 10, shown in FIG. 2, comprises a transmitter section 5, a receiver section 3, and an acoustic isolator 4 positioned between the transmitter section 5 and the receiver section 3. It should be noted that location of the transmitter section 5 and the receiver section 3, in FIG. 2, is exemplary, and they may be easily interchanged in location on either side of isolator 4. The transmitter section 5 may have monopole 22 and/or dipole 23 type sources, located in transmitter housing 51, for transmitting corresponding acoustic signals 21 into the formation 30 surrounding wellbore 2. Examples of such sources are described in U.S. Pat. No. 5,229,553 incorporated herein by reference. The signals 21 propagate through the formation 30 and are received at monopole 24 and/or dipole 25 receivers, located in receiver housing 52, in receiver section 3. Multiple monopole and/or dipole receivers may be located at predetermined axial spacings in receiver section 3. The dipole receivers 25 may be set at predetermined rotational orientations with respect to the dipole sources 23.

Figure 3B:
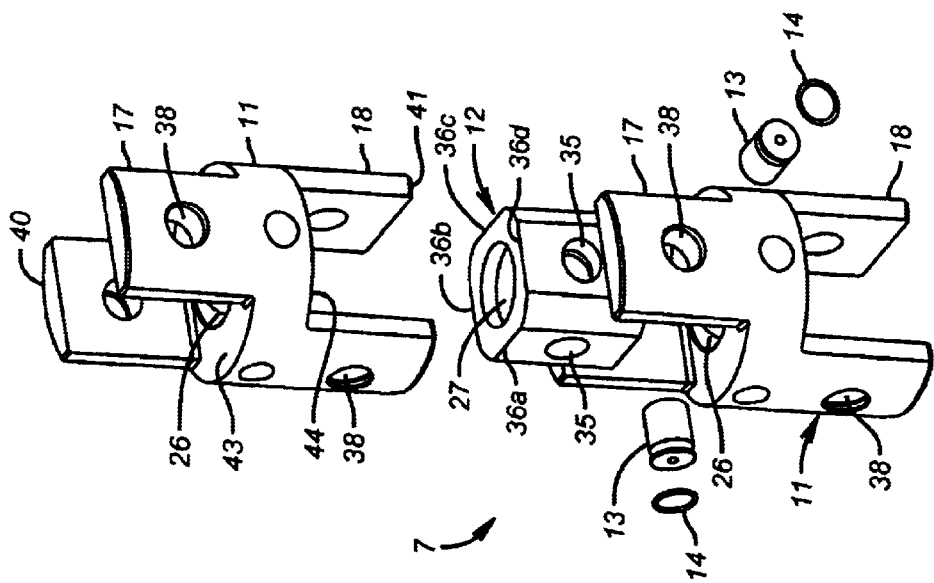
FIG. 3B is an exploded view of the parts of FIG. 3A according to one preferred embodiment of the present invention.
Figure 3A:
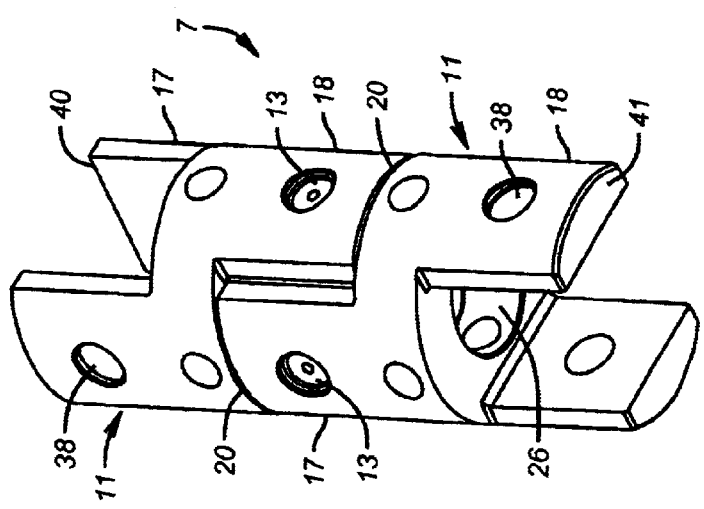
FIG. 3A is a schematic drawing of a portion of an isolator assembly according to one preferred embodiment of the present invention.

An acoustic isolator section 4, see FIG. 2, is placed between the transmitter section 5 and the receiver section 3 and is connected to transmitter and receiver housings 51 and 52 respectively, to attenuate acoustic signals that may propagate through the tool housings 52, 51 of the transmitter and receiver sections 3,5. As previously discussed, these through-tool signals may contaminate and/or interfere with the signals 21 through the formation causing errors in interpretation of the properties of formation 30. The acoustic isolator 4 is comprised of a predetermined number of serially connected universal-type joints 7. Referring to FIGS. 3A and 3B, each universal joint 7 comprises an inner yoke member 12, two outer link members 11 having ears 17, 18, and pins 13 for connecting the ears 17, 18 to the yoke 12. The ears 17 are formed substantially orthogonal to the ears 18. The yoke 12 has a through hole 27 for allowing passage of electrical wires for electrical communication between the transmitter and receiver sections. Additionally, the yoke 12 has four sides 36a–d, where 36a,c are substantially parallel to each other and 36b,d are substantially parallel to each other. In addition, sides 36a,c are substantially orthogonal to sides 36b,d. Counter-bored holes 35 are formed in each of the sides and have shoulders (not shown) for seating pins 13. The ears 17,18 of the link member 11 have corresponding bored holes 38, sized to receive pin 13.

At assembly, the yoke member 12 is captured between ears 17 and 18 of two link members 11, see FIG. 3B, such that the holes 35 in yoke member 12 align with the hole 38 in ears 17 and 18 of the link members 11. Typically, four pins 13 are inserted in each set of aligned holes 38,35 and are retained in position by a retaining device such as retaining ring 14 that fits into a suitable groove (not shown) in an inner diameter surface of hole 38. End caps 31,32, see FIG. 2, have a set of ears 17 on one end for connecting to the isolator joints 7, and a suitable connector, such as a threaded connection, on the other end for connecting to the receiver and transmitter sections 3,5. Electrical wires (not shown are fed through the center holes 26, 27 of the multiple joints and fed through suitable electrical connectors to connect to between the transmitter 5 and receiver sections 3 of the tool.

The end surfaces 40,41 of ears 17,18, see FIGS. 3A,B are substantially flat in contrast to a common universal joint wherein the corresponding surfaces are curved to allow free rotational motion of the link members. Likewise, the surfaces 43,44 of the body of link member 11 are substantially flat. When assembled, the surfaces 40,41 and 43,44 are separated by a gap 20. As will be appreciated by one skilled in the art, the interaction of the flat surfaces provide a limited flexure of the universal joint about the pinned connections of both axes defined by the pinned connections. The limited flexure can be adjusted by appropriately adjusting the dimensions of the ears 17, 18 to provide a smaller or larger gap 20. The axial and torsional loading capacities are essentially determined by the dimensions of the pins 13 and ears 17,18 while the desired length and rotational stability are determined by the clearances and tolerances between the pins 13 and the bore holes 35 and 38. Note that nominal machining tolerances, common in the art, are sufficient to establish axial and rotational alignment of transmitters and receivers using the present invention. The present invention may be scaled up or down to accommodate different tool sizes for different hole sizes as is common in the art.

Figure 4:
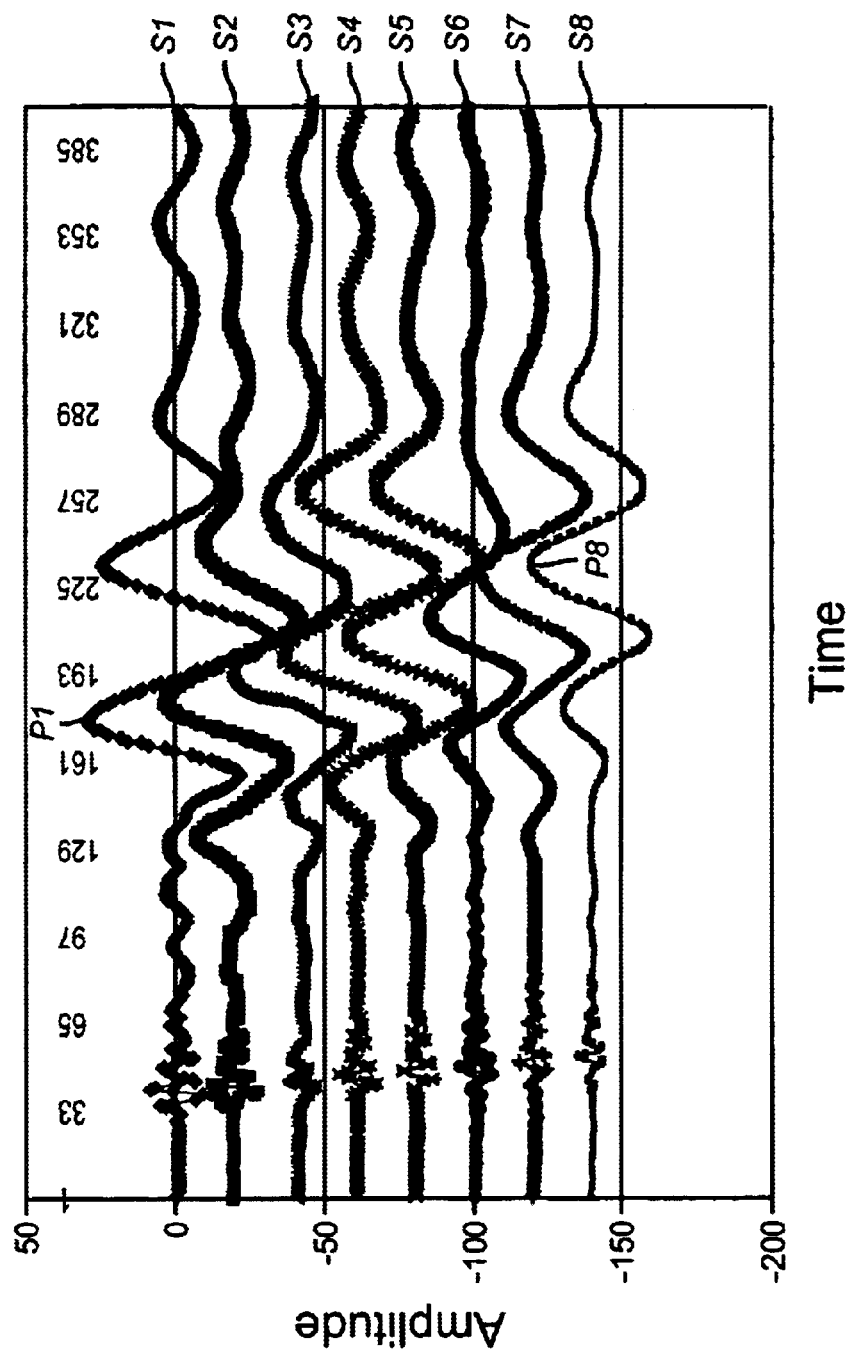
FIG. 4 is a chart of received acoustic signals using a prior art isolator.
Figure 5:
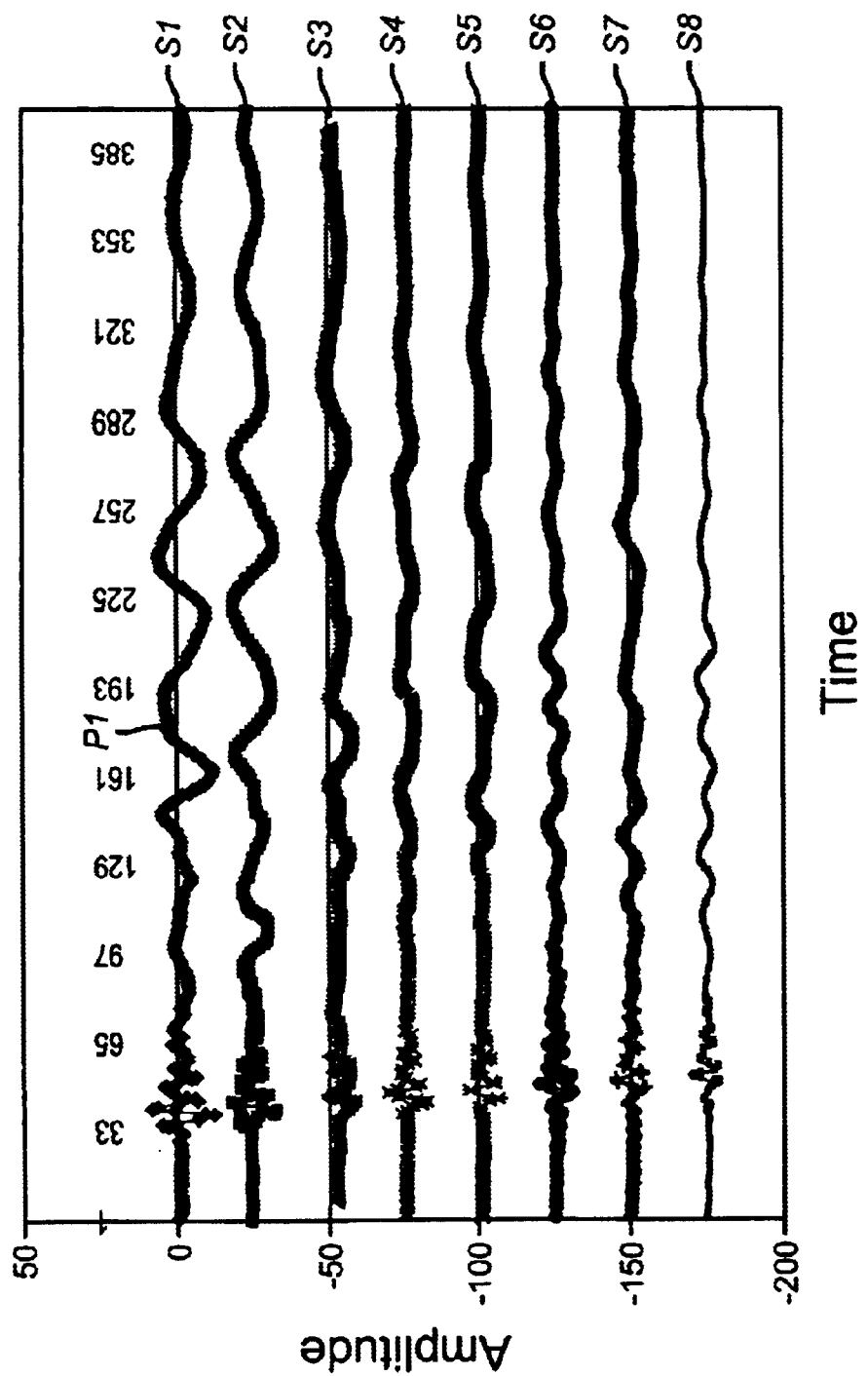
FIG. 5 is a chart of received acoustic signals using an acoustic isolator according to one preferred embodiment of the present invention.

The limited flexural movement of the joints 7 provides sufficient compliance to substantially attenuate the acoustic shear modes of transmission through the tool. The acoustic longitudinal mode is substantially attenuated by the elongated path and the acoustic transfer across the multiple pinned connections. FIGS. 4 and 5 illustrate the attenuation improvement in an exemplary isolator having ten joint sections 7 as compared to a prior art isolator such as that described in U.S. Pat. No. 5,229,553. FIG. 4 shows the received signal amplitudes S1–S8 as a function of time for an array of eight spaced apart receiver transducers in the receiver section. Received signal peaks are indicated by P1–P8 where indicators P2–P7 have been omitted from FIGS. 4 and 5 to avoid confuision. Note that the peaks P1–P8 are skewed in time relative to each other indicating the increased travel time to the successive spaced apart transducers. FIG. 5 shows the signals received by the same eight transducers using the isolator of the present invention. The chart is plotted using the same amplitude and time scales as used in FIG. 4. As is clearly seen, the amplitude of the received signals, as exemplified by P1, are greatly attenuated using the isolator of this invention. The peaks P2–P8 have been attenuated such that they are not readily discernible.

In a preferred embodiment, the isolatorjoints 7 are made of metallic materials. Alternatively, the isolator joints 7 may be made of fiber reinforced composite materials known in the art. In yet another alternative embodiment, the joints may be of a hybrid construction using both metallic and composite materials.

While there has been illustrated and described a particular embodiment of the present invention, it will be appreciated that numerous changes and modifications will occur to those skilled in the art, and it is intended in the appended claims to cover all those changes and modifications.

What is claimed is:

1. A system for determining the acoustic properties of a formation surrounding a wellbore, comprising:

a. a tubular member extending in the wellbore to a downhole formation of interest;

b. a transmitter disposed in said tubular member;

c. a receiver disposed in said tubular member spaced apart from said transmitter, and d. an acoustic isolator disposed in said tubular member between said transmitter and said receiver, said acoustic isolator comprising a first link coupled to a second link by a connecting pin such that an acoustic signal is attenuated when traveling from said first link to said second link through said connecting pin.

2. The system of claim 1, wherein the transmitter comprises at least one acoustic source.

3. The system of claim 2, wherein said at least one acoustic source is one of (i) a monopole source and (ii) a multipole source.

4. The system of claim 3, wherein the multipole source is a dipole source.

5. The system of claim 1, wherein the receiver comprises at least one acoustic receiver.

6. The system of claim 5, wherein the at least one acoustic receiver is one of (i) a monopole receiver and (ii) a multipole receiver.

7. The system of claim 6, wherein the multipole receiver is a dipole receiver.

8. The system of claim 1, wherein the acoustic isolator is made from at least one of (i) a metallic material and (ii) a composite material.

9. The system of claim 1, wherein the acoustic isolator is adapted to provide electrical connections between said transmitter section and said receiver section.

10. The system of claim 1, wherein the tubular member is one of (i) a wireline; (ii) a coiled tubing; and (iii) a jointed pipe string.

11. A method for performing acoustic investigations of a formation surrounding a wellbore, comprising:

a. conveying a tubular member having a transmitter and a receiver attached thereto, into the wellbore, wherein the receiver is spaced apart from the transmitter;

b. activating an acoustic source in the transmitter for generating acoustic signals;

c. attenuating acoustic signals traveling along the tubular member from the transmitter to the receiver using an acoustic isolator disposed in the tubular member between the transmitter and the receiver, the acoustic isolator comprising a first link coupled to a second link by a connecting pin such that the acoustic signal is attenuated when traveling from said first link to said second link through said connecting pin; and d. receiving said signals through the formation and through the acoustic isolator with the receiver on a side of the acoustic isolator opposite from the transmitter.

12. The method of claim 11 wherein the acoustic source is at least one of (i) a monopole source and (ii) a multipole source.

13. The method of claim 11 wherein the acoustic receiver is at least one of (i) a monopole receiver and (ii) a multipole receiver.

14. The method of claim 11, wherein the acoustic isolator is made from at least one of (i) a metallic material and (ii) a composite material.

15. The system of claim 1, further comprising a yoke coupled to said first link by a first connecting pin and to said second link by a second connecting pin.

16. The system of claim 15, wherein said first connecting pin is oriented substantially perpendicular to said second connecting pin.

17. The method of claim 11, further comprising coupling said first link to a yoke member with a first connecting pin and coupling said second link to said yoke member with a second connecting pin.

18. The method of claim 17, wherein the first pin is oriented substantially perpendicular to the second pin.

* * * * *